(12) United States Patent
Hatakeyama

(10) Patent No.: US 11,327,741 B2
(45) Date of Patent: May 10, 2022

(54) INFORMATION PROCESSING APPARATUS

(71) Applicant: Sony Interactive Entertainment Inc., Tokyo (JP)

(72) Inventor: Akiyuki Hatakeyama, Kanagawa (JP)

(73) Assignee: Sony Interactive Entertainment Inc., Tokyo (JP)

(*) Notice: Subject to any disclaimer, the term of this patent is extended or adjusted under 35 U.S.C. 154(b) by 0 days.

(21) Appl. No.: 16/924,481

(22) Filed: Jul. 9, 2020

(65) Prior Publication Data

US 2021/0034358 A1 Feb. 4, 2021

(30) Foreign Application Priority Data

Jul. 31, 2019 (JP) .............................. JP2019-141306

(51) Int. Cl.
*G06F 9/44* (2018.01)
*G06F 8/658* (2018.01)
*A63F 13/77* (2014.01)
*G06F 16/14* (2019.01)

(52) U.S. Cl.
CPC .............. *G06F 8/658* (2018.02); *A63F 13/77* (2014.09); *G06F 16/152* (2019.01)

(58) Field of Classification Search
None
See application file for complete search history.

(56) References Cited

U.S. PATENT DOCUMENTS

| | | | |
|---|---|---|---|
| 9,286,059 B2 | 3/2016 | Hatakeyama | |
| 2003/0123748 A1* | 7/2003 | Sebot | G06F 17/147 382/254 |
| 2013/0013880 A1* | 1/2013 | Tashiro | H03M 7/30 711/170 |
| 2013/0275708 A1 | 10/2013 | Doi | |
| 2015/0301823 A1* | 10/2015 | Hatakeyama | G06F 8/71 717/173 |
| 2017/0038978 A1* | 2/2017 | Li | G06F 3/067 |

FOREIGN PATENT DOCUMENTS

| | | |
|---|---|---|
| JP | 2009230523 A | 10/2009 |
| JP | 2015207145 A | 11/2015 |
| WO | 2012081099 A1 | 6/2012 |

OTHER PUBLICATIONS

Notice of Reasons for Refusal for corresponding JP Application No. 2019-141306, 5 pages, dated Jun. 30, 2021.

* cited by examiner

*Primary Examiner* — Anna C Deng
(74) *Attorney, Agent, or Firm* — Matthew B. Dernier, Esq.

(57) ABSTRACT

Disclosed herein is an information processing apparatus including a first holding section configured to hold a first patch file, a second holding section configured to hold a first hash value of each data block in a second patch file including a plurality of data blocks each having a predetermined block size, a hash value calculating section configured to calculate a first hash value of data corresponding to the block size in the first patch file, and a comparing section configured to compare the first hash value calculated by the hash value calculating section with the first hash value of each data block held in the second holding section, as a first-stage comparison process.

9 Claims, 9 Drawing Sheets

FIG. 2
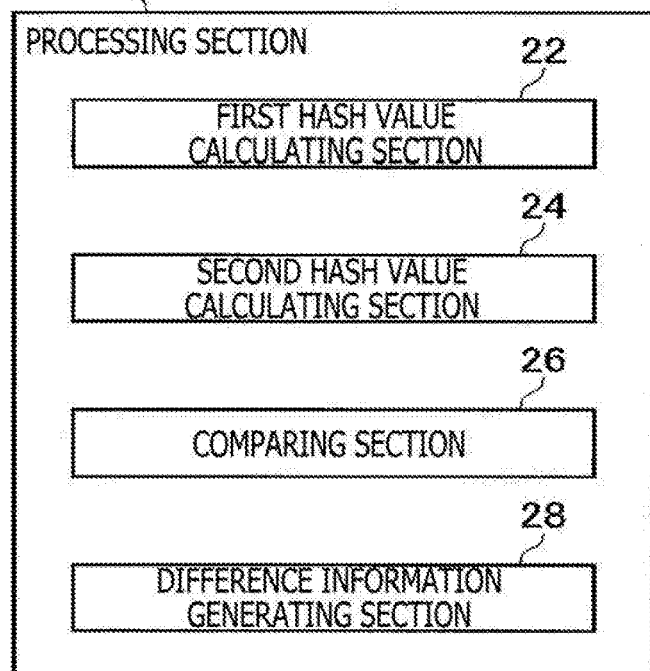
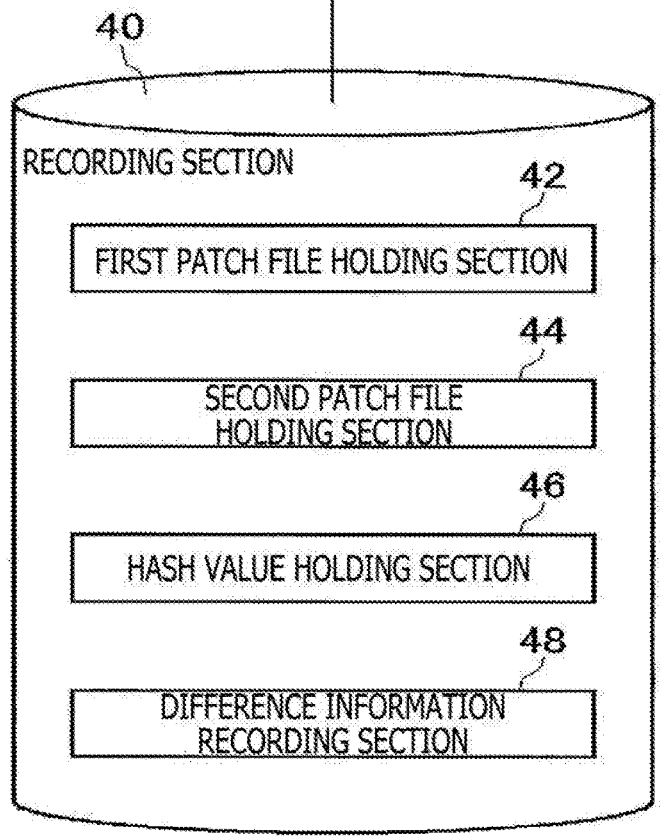

F I G. 4
FIRST PATCH FILE
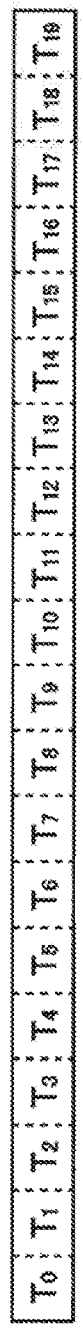
SECOND PATCH FILE
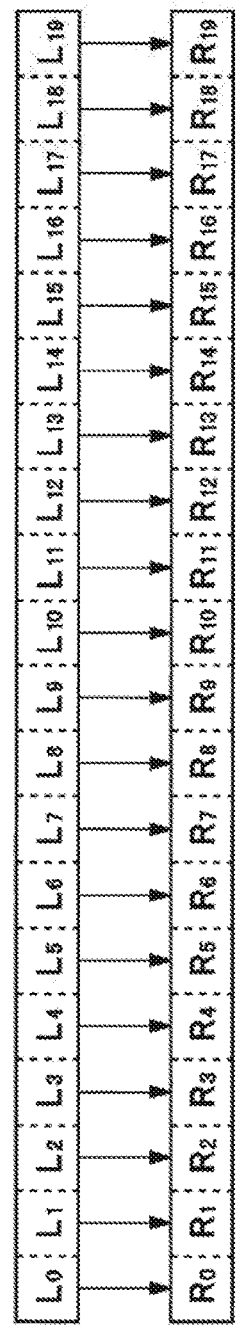
FIRST HASH VALUE

INFORMATION PROCESSING APPARATUS

CROSS REFERENCE TO RELATED APPLICATIONS

This application claims the benefit of Japanese Priority Patent Application JP 2019-141306 filed Jul. 31, 2019, the entire contents of which are incorporated herein by reference.

BACKGROUND

The present disclosure relates to a technique for reducing an amount of data to be distributed.

JP 2015-207145 A discloses difference information generating software that compares hash values of data blocks in two different versions of patch files and determines whether the same data blocks exist between the two versions.

SUMMARY

The difference information generating software disclosed in JP 2015-207145 A determines whether two different versions of patch files are identical with respect to each data block. Therefore, even if the data of the data block of the new version is included in the old version, when the recording position in the data block is shifted, it is not determined that the data block is identical because the data is different as a data block. In other words, according to the technique disclosed in JP 2015-207145 A, there is a problem that, even if the data of the new version in the data block is included in the old version, the data may not be confirmed to be included in the old version due to a shift in the recording position in the data block, and an amount of distribution data may not be effectively reduced. Further, the process of searching for duplicate data between two different versions of patch files should preferably be performed efficiently.

Therefore, according to an embodiment of the present disclosure, it is desirable to provide a technique for efficiently reducing an amount of data to be distributed.

An information processing apparatus according to an embodiment of the present disclosure includes a first holding section configured to hold a first patch file, a second holding section configured to hold a first hash value of each data block in a second patch file including a plurality of data blocks each having a predetermined block size, a hash value calculating section configured to calculate a first hash value of data corresponding to the block size in the first patch file, and a comparing section configured to compare the first hash value calculated by the hash value calculating section with the first hash value of each data block held in the second holding section, as a first-stage comparison process. When determining that the calculated first hash value agrees with the first hash value held in the second holding section in the first-stage comparison process, the comparing section compares a second hash value of the data corresponding to the block size in the first patch file with a second hash value of a data block whose first hash value agrees in the second patch file, as a second-stage comparison process, and determines that the data corresponding to the block size in the first patch file agrees with data included in the data block of the second patch file when determining that the second hash value in the first patch file agrees with the second hash value in the second patch file.

Another embodiment of the present disclosure also relates to an information processing apparatus. The information processing apparatus includes a first holding section configured to hold a first patch file, a second holding section configured to hold a hash value of each data block of a second patch file including a plurality of data blocks each having a predetermined block size, a hash value calculating section configured to calculate a hash value of data corresponding to the block size in the first patch file, and a comparing section configured to compare the hash value calculated by the hash value calculating section with the hash value of each data block held in the second holding section. The hash value calculating section calculates a first hash value of data obtained by shifting the data corresponding to the block size in the first patch file by a predetermined number of bytes at a time.

Note that any combination of the above-described components and any conversion of the expression of the present disclosure among a method, an apparatus, a system, a recording medium, a computer program, and the like are also effective as embodiments of the present disclosure.

According to the information processing technology of an embodiment of the present disclosure, a technology for efficiently reducing an amount of data to be distributed can be provided.

BRIEF DESCRIPTION OF THE DRAWINGS

FIG. 2 is a diagram illustrating functional blocks of the information processing apparatus;

FIG. 4 is a diagram illustrating an example of a first hash value of each data block;

DETAILED DESCRIPTION OF THE PREFERRED EMBODIMENT

Figure 1:
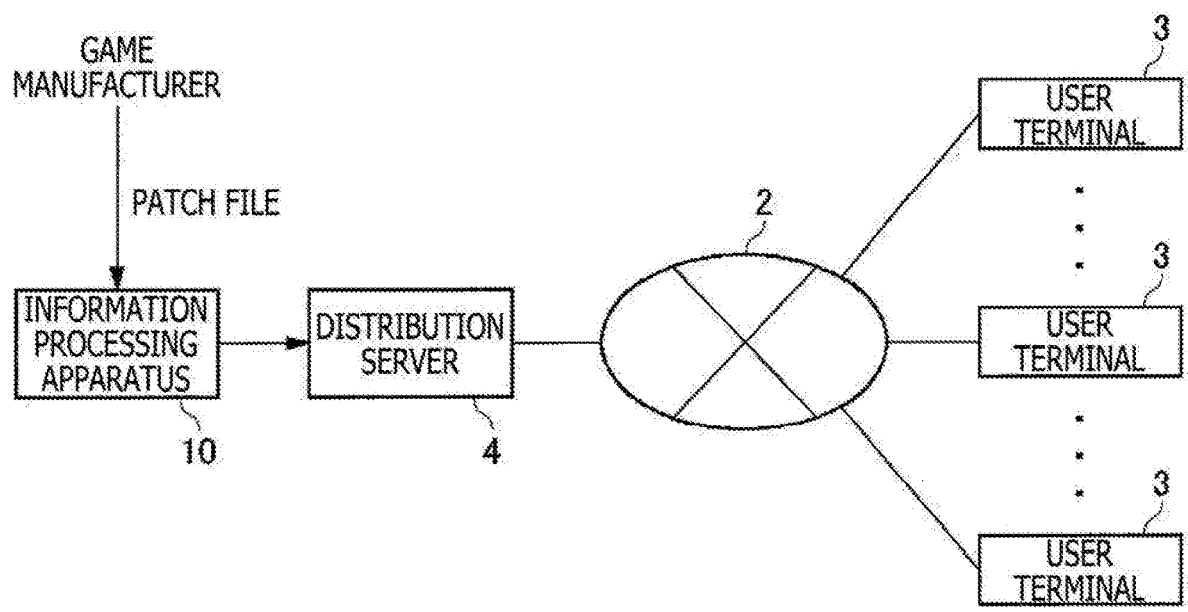
FIG. 1 is a diagram illustrating an application distribution system according to an embodiment.

FIG. 1 illustrates an application distribution system 1 according to an embodiment of the present disclosure. The application distribution system 1 includes a distribution server 4 that distributes application software and patch files, an information processing apparatus 10 that uploads the application software and patch files to the distribution server 4 to make the software and files distributable, and a plurality of user terminals 3 for downloading application software and patch files from the distribution server 4 via a network 2 such as the Internet. In the embodiment, the application software is a game software, and the user terminal 3 may be a game device.

The game manufacturer creates a patch file when modifying or adding a scenario. The patch file is provided from the game manufacturer to the information processing apparatus 10 and is uploaded to the distribution server 4 such that the patch file can be distributed. The user terminal 3 downloads the patch file from the distribution server 4, so that the game can be executed in the latest state. Scenarios are often modified or added frequently, and patch files are managed by version information.

In a case where a plurality of versions of the patch files are released, the user terminal 3 can start the game in the latest state by downloading the latest version of the patch file. Since the user terminal 3 has not necessarily downloaded all versions of the patch file, the latest patch file includes modified contents and additional contents included in the past version of the patch file. Therefore, as the version is newer, a data amount of the patch file becomes larger.

When the user terminal 3 downloads the latest version of the patch file, it is not necessary to download the contents included in the previously downloaded patch file of the past version. Therefore, the information processing apparatus 10 of the embodiment checks whether the data included in the data block of the latest version of the patch file is included in the past version of the patch file, and allows distribution of only the un-downloaded data block to the user terminal 3.

FIG. 2 illustrates functional blocks of the information processing apparatus 10. The information processing apparatus 10 includes a processing section 20 and a recording section 40. The processing section 20 includes a first hash value calculating section 22, a second hash value calculating section 24, a comparing section 26, and a difference information generating section 28, and the recording section 40 includes a first patch file holding section 42, a second patch file holding section 44, a hash value holding section 46, and a difference information recording section 48.

These configurations are accomplished by a central processing unit (CPU), a memory, program loaded in the a memory, a storage, and the like of a given computer in terms of hardware components, and here, functional blocks implemented by their cooperation are illustrated. Therefore, it is understood by those skilled in the art that these functional blocks can be implemented in various forms by hardware only, software only, or a combination thereof.

The information processing apparatus 10 is managed by the same operating entity as the distribution server 4, and generates difference information between a new patch file and an old patch file. The function of the information processing apparatus 10 may be provided to a game manufacturer to be used to confirm how much a distribution data amount of a new patch file can be reduced.

Much data is common between patch files of different versions. In a case where an old patch file of version 1 and a new patch file of version 2 exist, when the user terminal 3 has already downloaded the patch file of version 1, downloading a data block including the same data in the patch file of version 2 wastes network resources. Therefore, it is preferable not to download the data already downloaded onto the user terminal 3 from the distribution server 4.

The first patch file holding section 42 holds a first patch file of an old version 1, and the second patch file holding section 44 holds a second patch file of a new version 2. The second patch file may be the latest patch file. When receiving the second patch file from the game manufacturer, the information processing apparatus 10 stores the second patch file in the second patch file holding section 44, and perform a process for confirming whether there is a data block that does not need to be distributed due to the relationship to the first patch file among a plurality of data blocks of the second patch file.

Figure 3:
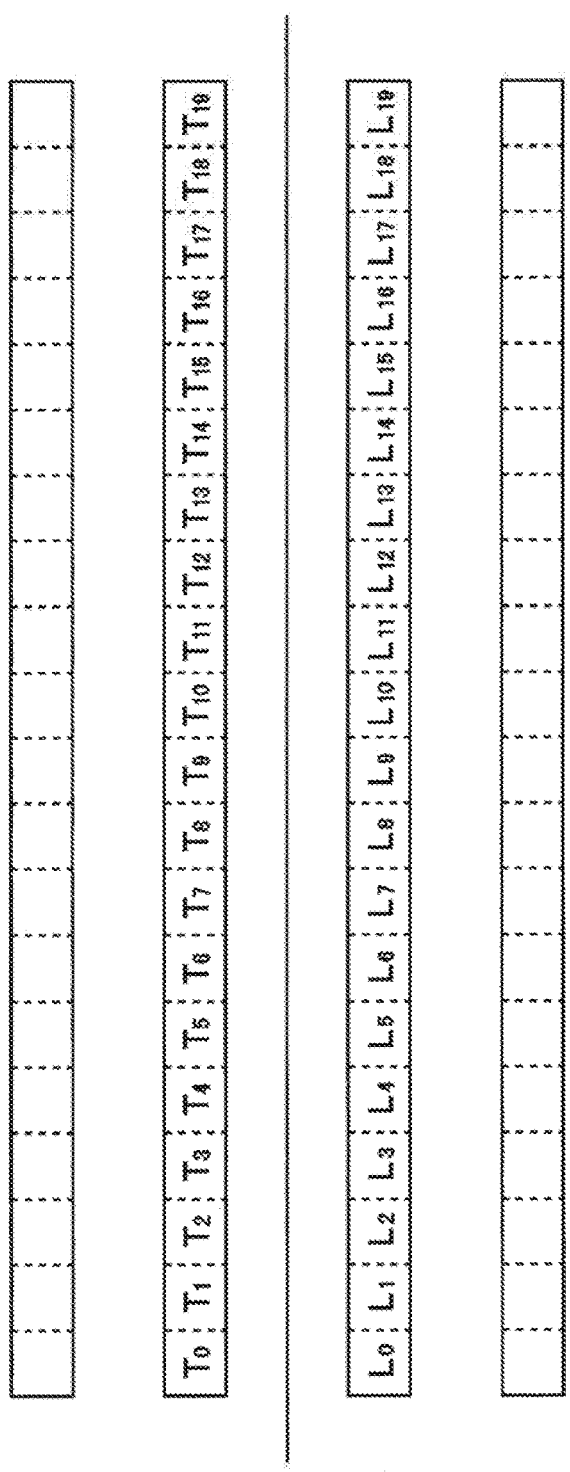
FIG. 3 is a diagram illustrating an example of a first patch file and a second patch file.

FIG. 3 illustrates an example of a first patch file and a second patch file. Each patch file includes a plurality of data blocks each having a predetermined block size. Patch files may be compressed or uncompressed. The data block is a basic unit for transferring data by the file system, and is set to 64 kilobytes, for example. Although the actual patch file includes an enormous number of data blocks, for convenience of explanation, an example in which the first patch file includes 20 data blocks $T_0$ to $T_{19}$, and the second patch file includes 20 data blocks $L_0$ to $L_{19}$ is illustrated in FIG. 3.

In the embodiment, the first patch file has already been downloaded to the user terminal 3. Each of the data blocks $L_0$ to $L_{19}$ of the second patch file is a distribution candidate. Hereinafter, a method of checking whether the data of the data blocks $L_0$ to $L_{19}$ of the second patch file is included in the first patch file will be described.

FIG. 4 illustrates a first hash value of each data block of the second patch file. The first hash value calculating section 22 calculates a first hash value of each data block of the second patch file. Here, the first hash value calculating section 22 calculates a 64-bit rolling hash value R using a linear congruential generator. To be specific, the first hash$_0$value calculating section 22 calculates the first hash value of the data block $L_0$ as $R_0$, the first hash value of the data block $L_1$ as $R_1$, ..., and the first hash value of the data block $L_{19}$ as $R_{19}$. The first hash value calculating section 22 causes the hash value holding section 46 to store the calculated first hash value. Thus, the hash value holding section 46 holds the first hash value of each data block of the second patch file.

Thereafter, a process of confirming whether the data of the first patch file is the same as the data of the data block of the second patch file is performed. Here, the data of the first patch file to be compared is data corresponding to the block size having consecutive addresses. The first hash value calculating section 22 calculates a first hash value of the data of the block size in the first patch file.

First, the first hash value calculating section 22 calculates a first hash value of data corresponding to the block size from the first byte of the first patch file.

Figure 5:
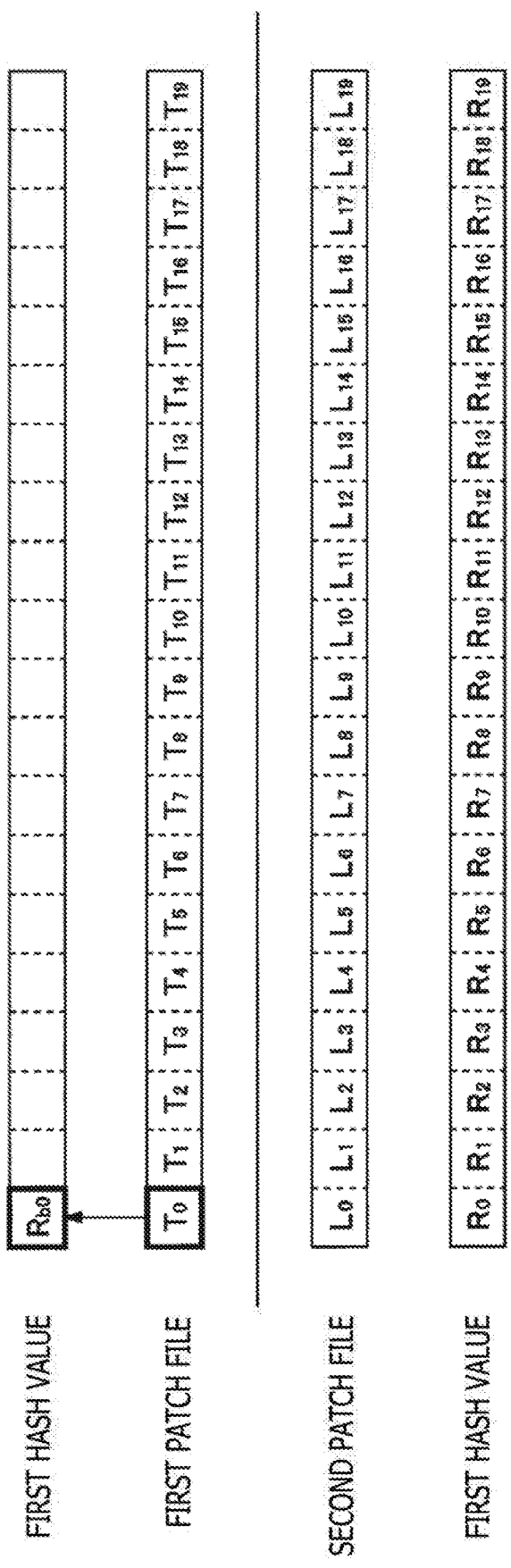
FIG. 5 is a diagram illustrating an example of the first hash value.

FIG. 5 illustrates a first hash value $R_{b0}$ of the data of the block size from the first byte of the first patch file. The data corresponding to the block size from the first byte of the first patch file corresponds to the data of the data block $T_0$. That is, the first hash value calculating section 22 calculates the 64-bit rolling hash value $R_{b0}$ of the data block $T_0$.

The comparing section 26 of the embodiment performs comparison processes of two stages. The comparing section 26 compares the first hash values with each other as a first-stage comparison process, and when determining an agreement between the first hash values, the comparing section 26 compares the second hash values having a lower collision probability than the first hash value with each other, as a second-stage comparison process.

First, as the first-stage comparison process, the comparing section 26 compares the first hash value calculated by the first hash value calculating section 22 with the first hash value of each data block of the second patch file held in the hash value holding section 46. That is, the comparing section 26 compares the calculated first hash value $R_{b0}$ with the first hash values $R_0$ to $R_{19}$ of respective data blocks of the second patch file. At this time, if the first hash value $R_{b0}$ agrees with any of the first hash values $R_0$ to $R_{19}$, the comparing section 26 performs the second-stage comparison process, but here, it is confirmed that the first hash value $R_{b0}$ does not agree with any of the first hash values $R_0$ to $R_{19}$ and the data block including the same data as the data block $T_0$ of the first patch file does not exist in the second patch file.

Next, the first hash value calculating section 22 identifies the data corresponding to the same block size by sliding the data of the block size whose first hash value has been obtained last time, by a predetermined number of bytes, and calculates the first hash value of the identified data. The number of bytes by which the data is slid is smaller than the block size (64 kilobytes) and may be 1 byte.

Figure 6:
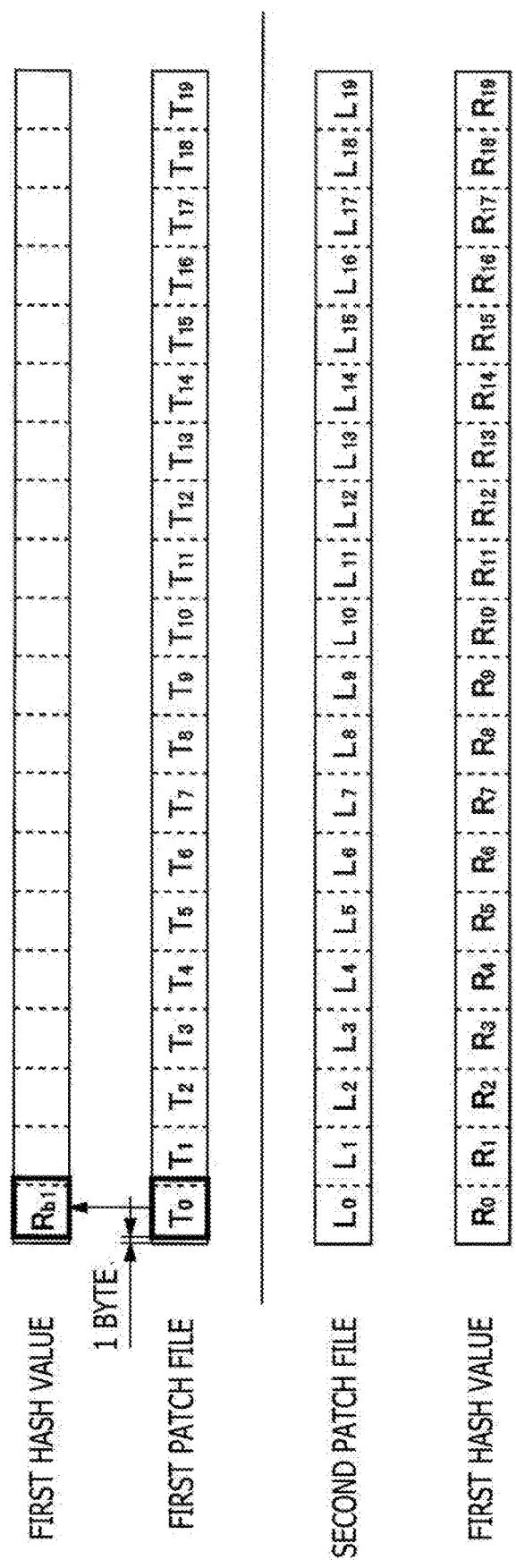
FIG. 6 is a diagram illustrating another example of the first hash value.

FIG. 6 illustrates a first hash value $R_{b1}$ of data of the block size obtained by sliding the previous data corresponding to the block size by a predetermined number of bytes. As compared to the data of the block size of FIG. 5, the data of the block size illustrated in FIG. 6 is data obtained by shifting the data of the data block $T_0$ by a predetermined number of bytes. In the embodiment, the predetermined number of bytes is "1 byte," and the first hash value calculating section 22 calculates a 64-bit rolling hash value $R_{b1}$ of data obtained by sliding the previous data by 1 byte.

The comparing section 26 compares, as the first-stage comparison process, the first hash value $R_{b1}$ calculated by the first hash value calculating section 22 and the first hash values $R_0$ to $R_{19}$ of respective data blocks of the second patch file held in the hash value holding section 46. Here, it is confirmed that the first hash value $R_{b1}$ does not agree with any of the first hash values $R_0$ to $R_{19}$, and the data block of the second patch file does not agree with the data of 64 kilobytes obtained by sliding the data block $T_0$ of the first patch file by 1 byte.

Thereafter, the first hash value calculating section 22 identifies data obtained by shifting by 1 byte, the data of the block size whose first hash value has been obtained, and calculates the first hash value of the data.

Figure 7:
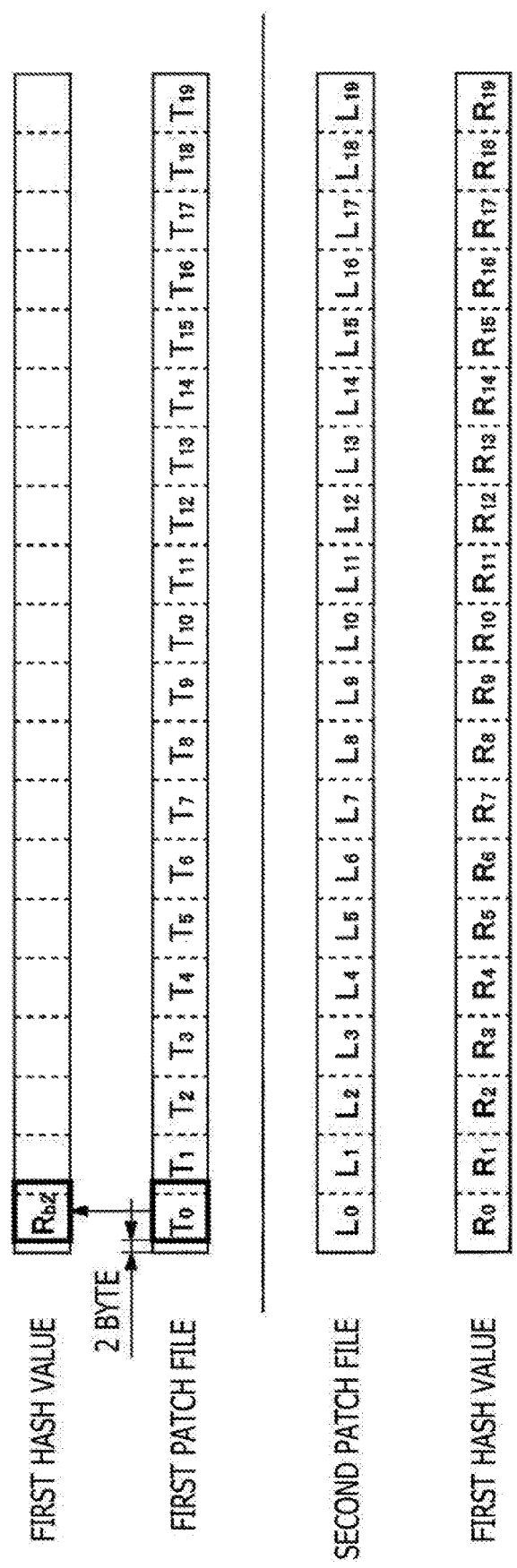
FIG. 7 is a diagram illustrating still another example of the first hash value.

FIG. 7 illustrates a first hash value $R_{b2}$ of data obtained by sliding by one byte, the data of the block size whose first hash value has been obtained last time. When the first hash value calculating section 22 calculates the 64-bit rolling hash value $R_{b2}$ of the data obtained by sliding the data block $T_0$ of the first patch file by 2 bytes, the comparing section 26 compares the calculated first hash value $R_{b2}$ with the first hash values $R_0$ to $R_{19}$ of respective data blocks of the second patch file. Here, it is confirmed that the first hash value $R_{b2}$ does not agree with any of the first hash values $R_0$ to $R_{19}$ and the data block of the second patch file does not agree with the data of 64 kilobytes that is obtained by sliding the data block $T_0$ of the first patch file by 2 bytes.

Figure 8:
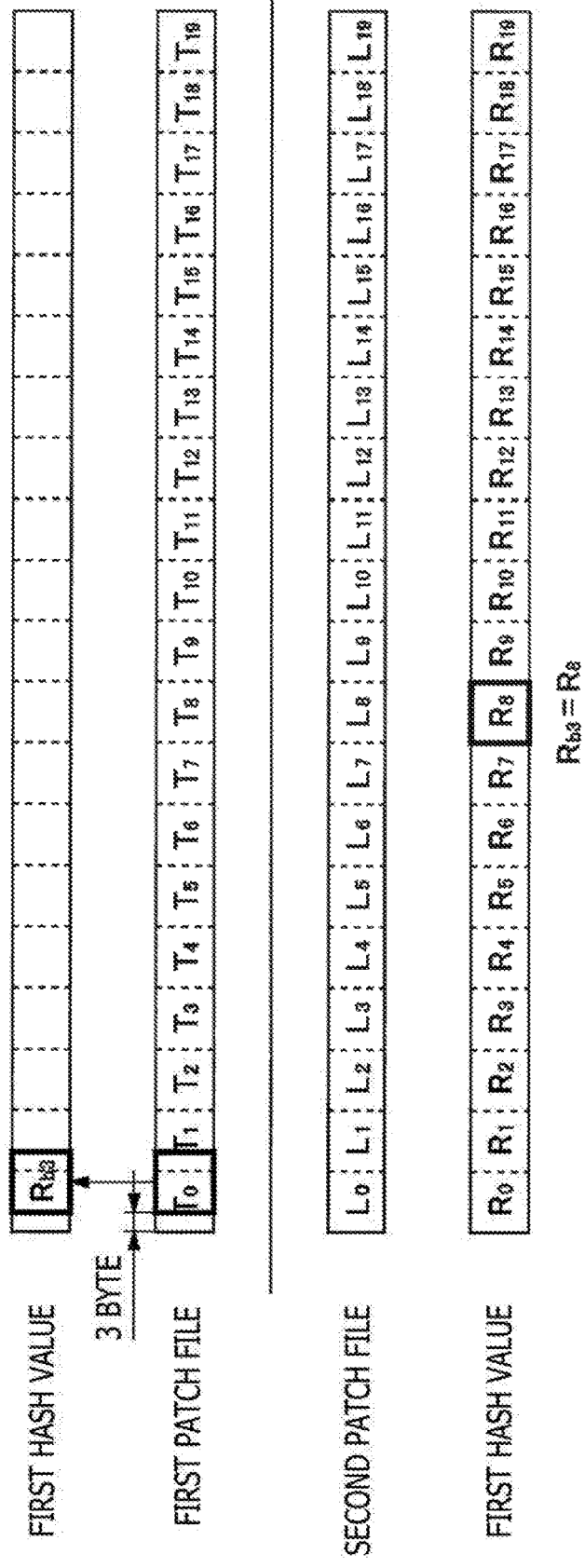
FIG. 8 is a diagram illustrating yet another example of the first hash value.

FIG. 8 illustrates a first hash value $R_{b3}$ of data obtained by sliding by 1 byte, the data of the block size whose first hash value has been obtained last time. When the first hash value calculating section 22 calculates a 64-bit rolling hash value $R_{b3}$ of data obtained by sliding the data block $T_0$ of the first patch file by 3 bytes, the comparing section 26 compares the calculated first hash value $R_{b3}$ with the first hash values $R_0$ to $R_{19}$ of respective data blocks of the second patch file.

At this time, the comparing section 26 determines whether the first hash value $R_{b3}$ agrees with any of the first hash values $R_0$ to $R_{19}$ of respective data blocks of the second patch file. Here, the first hash value $R_8$ agrees with the first hash value $R_{b3}$. When determining that the first hash values agree with each other in the first-stage comparison process, the comparing section 26 determines a high probability that the data of the block size in the first patch file is identical to the data block $L_8$ in the second patch file.

Subsequently, the comparing section 26 compares, as the second-stage comparison process, the second hash value of the data of the block size in the first patch file with the second hash value of the data block $L_8$ whose first hash value agrees in the second patch file. The second-stage comparison process uses a second hash value having a lower collision probability than the first hash value used in the first-stage comparison process. The second hash value may be calculated as a 256-bit hash value by the SHA-256 algorithm (SHA: Secure Hash Algorithm).

It is known that the number of bits of the hash value should be increased in order to lower the collision probability of the hash value. Therefore, also in the embodiment, the collision probability in the second-stage comparison processing can be reduced by making the number of bits of the second hash value larger than the number of bits of the first hash value.

The second hash value calculating section 24 calculates the second hash value $H_{b3}$ of the data of the block size in the first patch file by using the SHA-256 algorithm, and also calculates the second hash value $H_8$ of the data block $L_8$ whose first hash value agrees in the second patch file. Note that the second hash value calculating section 24 may calculate the second hash values $H_0$ to $H_{19}$ of the data blocks $L_0$ to $L_{19}$ of the second patch file in advance and may cause the hash value holding section 46 to store the values. Thus, before the start of the second-stage comparison process, the hash value holding section 46 may hold the second hash value of each data block of the second patch file.

Figure 9:
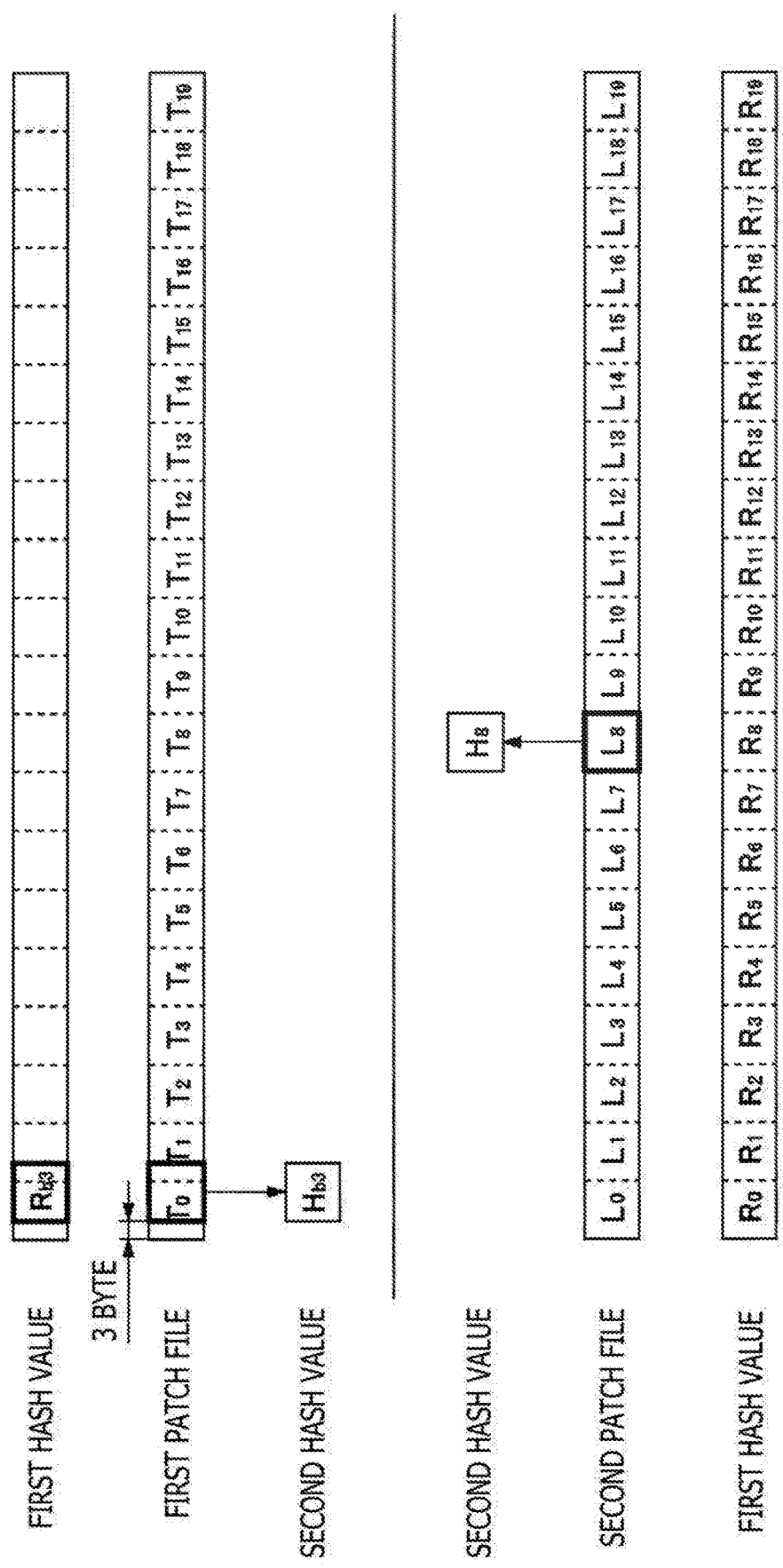
FIG. 9 is a diagram illustrating an example of a second hash value.

FIG. 9 illustrates the two calculated second hash values. The comparing section 26 compares the second hash value $H_{b3}$ of the data of the block size in the first patch file with the second hash value $H_8$ of the data block $L_8$ whose first hash value agrees in the second patch file, and if the second hash values agree with each other, the comparing section 26 determines that the data of the block size in the first patch file agrees with the data included in the data block $L_8$ of the second patch file. Note that if the second hash values do not agree with each other, the comparing section 26 determines that the data of the block size in the first patch file is different from the data included in the data block $L_8$ of the second patch file.

The difference information generating section 28 acquires the address information of the first patch file including the data of the data block $L_8$ that agrees in the second patch file. This address information forms difference information between the second patch file and the first patch file, and is recorded in the difference information recording section 48. The difference information is generated for each data block of the second patch file, and for a data block in which the same data as data in the first patch file is included, flag information (flag value 1) indicating that the same data is included in the first patch file and address information of the first patch file are recorded as difference information.

When the first hash value calculating section 22 calculates the first hash value of the data including the last byte of the first patch file, and the comparison process by the comparing section 26 ends, the difference information generating section 28, for a data block in which the same data as data in the first patch file is not included, records flag information (flag value 0) indicating that the same data is not included in the first patch file as difference information.

In the embodiment, the comparing section 26 performs the first-stage comparison process using the 64-bit first hash value, thereby an amount of calculation in the first stage can be significantly reduced compared with the case of performing the first-stage comparison process using the 256-bit hash value. Further, in the embodiment, the first hash value calculating section 22 calculates the first hash value by sliding the data of the block size of the first patch file by 1 byte at a time, and the comparing section 26 repeats the first-stage comparison process of comparing the calculated first hash value with the first hash value of each data block of the second patch file. This makes it possible to extract all data likely to be the same as the data included in the data block of the second patch file from the first patch file, and thus, an distribution data amount of the second patch file can be greatly reduced.

When completing all the processes, the information processing apparatus 10 encrypts the second patch file in each data block, and uploads the encrypted second patch file and the difference information recorded in the difference information recording section 48 onto the distribution server 4 to make the information available for distribution.

When the user terminal 3 having downloaded the first patch file requests the distribution server 4 to transmit the second patch file, the distribution server 4 confirms that the user terminal 3 has downloaded the first patch file. Then, the distribution server 4 executes the distribution process of the second patch file with reference to the difference information between the first patch file and the second patch file. In this distribution process, a data block to which a flag value of 0 is set is distributed, while a data block to which a flag value of 1 is set is not distributed and the associated address information of the first patch file is distributed.

The present disclosure has been described on the basis of the embodiments. This embodiment is an exemplification, and it is understood by those skilled in the art that various modifications can be made to the combination of respective components and respective processing processes, and that such modifications are also within the scope of the present disclosure. In the embodiment, a game is described as an example of the application, but another application may be used.

In the embodiment, it has been described that the first hash value calculating section 22 calculates the first hash value by sliding the data corresponding to the block size in the first patch file by 1 byte at a time. As illustrated in FIG. 9, when the comparing section 26 determines that the data of the block size in the first patch file agrees with a data block in the second patch file, the first hash value calculating section 22 may calculate data obtained by shifting the previous data of the block size by the block size, specifically, a first hash value of the data of the block size continuous from the address next to the end address in the previous block size.

The same data is often recorded in the patch file for the purpose of efficiency of data reading and the like. Therefore, when the comparing section 26 repeats the comparison process after finding the data block $L_8$ that agrees with the data in the first patch file, another data in the first patch file may agree with the data block $L_8$. In this case, the difference information generating section 28 preferably records the address information of the subsequent data of the first patch file whose data structure is close to the second patch file as the difference information with respect to the data block $L_8$.

In the embodiment, the comparing section 26 performs the first-stage comparison process using the 64-bit first hash value. In order to increase the processing efficiency of the first stage, the comparing section 26 may divide and execute the first-stage comparison process. That is, the comparing section 26 may first perform an agreement determination using some of the 64 bits, and then may perform a process of comparing the 64 bits of the first hash value that has partially agreed. At this time, the hash value holding section 46 extracts and holds the upper 24 bits of the first hash values $R_0$ to $R_{19}$ in addition to the first hash values $R_0$ to $R_{19}$, and the comparing section 26 may first compare the upper 24 bits of the first hash value calculated by the first hash value calculating section 22 with the upper 24 bits of the first hash values $R_0$ to $R_{19}$ held in the hash value holding section 46.

In a modification example, the first hash value calculating section 22 may be substituted for the second hash value calculating section 24. In a modification example, the first hash value calculating section 22 calculates one or more first hash values having different values of the same bit length, together with the first hash value used in the first-stage comparison process. To be specific, the first hash value calculating section 22 calculates a plurality of first hash values having different values of the same bit length by changing the parameters of the linear congruential method. The comparing section 26 may use one or more first hash values having different values of the same bit length as at least a part of the second hash value. For example, the comparing section 26 may use a total of 256 bits as the second hash value by the first hash value calculating section 22 calculating three types of first hash values having different values together with the first hash value to be used in the first-stage comparison processing.

What is claimed is:

1. An information processing apparatus comprising:
a first holding circuit configured to hold data blocks of a first patch file, which data blocks are not hash values of data blocks of the first patch file;
a second holding circuit configured to hold, for each of a plurality of data blocks in a second patch file each having a predetermined block size, a respective first hash value of each of the plurality of data blocks;
a hash value calculating circuit configured to sequentially calculate a series of first hash values of data, in the first patch file, corresponding to the predetermined block size, each such corresponding data of such predetermined block size having a starting data point at a predetermined number of bytes after the starting data point of previous such corresponding data of such predetermined block size, the predetermined number of bytes being less than the predetermined block size; and
a comparing circuit configured to compare each of the sequentially calculated first hash values with each of the respective first hash values, as a first-stage comparison process,
wherein, when determining that one of the sequentially calculated first hash values agrees with one of the respective first hash values, the comparing circuit compares a second hash value of the corresponding data of the predetermined block size with a second hash value of a data block having the one of the respective first hash values, as a second-stage comparison process, and determines that the corresponding data of the predetermined block size in the first patch file agrees with data included in the data block, of the second patch file, having the one of the respective first hash values, when determining that the second hash value in the first patch file agrees with the second hash value in the second patch file.

2. The information processing apparatus according to claim 1, wherein a number of bits of the second hash value is greater than a number of bits of the first hash value.

3. The information processing apparatus according to claim 1, wherein the second holding circuit holds the second hash value of each data block of the second patch file.

4. The information processing apparatus according to claim 1, wherein
the hash value calculating circuit calculates one or more first hash values having different values of a same bit length, together with the first hash value used in the first-stage comparison process, and the comparing circuit uses the calculated one or more first hash values having the different values of the same bit length, as at least a part of the second hash value.

5. The information processing apparatus according to claim 1, wherein the hash value calculating circuit calculates the first hash value of data obtained by shifting the data corresponding to the block size in the first patch file by a predetermined number of bytes.

6. The information processing apparatus according to claim 5, wherein the hash value calculating circuit calculates the first hash value of data obtained by shifting the data corresponding to the block size in the first patch file by 1 byte.

7. An information processing apparatus comprising:
a first holding circuit configured to hold data blocks of a first patch file, which data blocks are not hash values of data blocks of the first patch file;
a second holding circuit configured to hold, for each of a plurality of data blocks in a second patch the each having a predetermined block size, a respective first hash value of each of the plurality of data blocks;
a hash value calculating circuit configured to sequentially calculate a series of first hash values of data, in the first patch the, corresponding to the predetermined block size, each such corresponding data of such predetermined block size having a starting data point at a predetermined number of bytes after the starting data point of previous such corresponding data of such predetermined block size, the predetermined number of bytes being less than the predetermined block size; and
a comparing circuit configured to compare each of the sequentially calculated first hash values with each of the respective first hash values, as a first-stage comparison process, and compare a second hash value of the corresponding data of the predetermined block size with a second hash value of a data block having the one of the respective first hash values, as a second-stage comparison process;
wherein the hash value calculating circuit sequentially calculates the series of first hash values of data obtained by shifting the data corresponding to the block size in the first patch the by a-the predetermined number of bytes at a time.

8. A non-transitory, computer-readable storage medium containing a computer program, which when executed by a computer that is connected to a first holding section that holds data blocks of a first patch the, which data blocks are not hash values of data blocks of the first patch file, and a second holding section that holds, for each of a plurality of data blocks in a second patch file each having a predetermined block size, a respective first hash value of each of the plurality of data blocks, causes the computer to carry out actions, comprising:
sequentially calculating a series of first hash values of data, in the first patch file, corresponding to the predetermined block size, each such corresponding data of such predetermined block size having a starting data point at a predetermined number of bytes after the starting data point of previous such corresponding data of such predetermined block size, the predetermined number of bytes being less than the predetermined block size;
comparing each of the sequentially calculated first hash values with each of the respective first hash values, as a first-stage comparison process;
comparing a second hash value of the corresponding data of the predetermined block size with a second hash value of a data block having the one of the respective first hash values, as a second-stage comparison process, when determining that one of the sequentially calculated first hash values agrees with one of the respective first hash values; and
determining that the corresponding data of the predetermined block size in the first patch file agrees with data included in the data block, of the second patch file, having the one of the respective first hash values, when determining the second hash value in the first patch file agrees with the second hash value in the second patch file in the second-stage comparison process.

9. A non-transitory, computer-readable storage medium containing a computer program, which when executed by a computer that is connected to a first holding section that holds data blocks of a first patch the, which data blocks are not hash values of data blocks of the first patch the, and a second holding section that holds, for each of a plurality of data blocks in a second patch the each having a predetermined block size, a respective first hash value of each of the plurality of data blocks, causes the computer to carry out actions, comprising:
sequentially calculating a series of first hash values of data, in the first patch file, corresponding to the predetermined block size, each such corresponding data of such predetermined block size having a starting data point at a predetermined number of bytes after the starting data point of previous such corresponding data of such predetermined block size, the predetermined number of bytes being less than the predetermined block size; and
comparing each of the sequentially calculated first hash values with each of the respective first hash values, as a first-stage comparison process, and comparing a second hash value of the corresponding data of the predetermined block size with a second hash value of a data block having the one of the respective first hash values, as a second-stage comparison process;
wherein the calculating the hash value includes, by a hash value calculating section, sequentially calculating the series of first hash values of data obtained by shifting the data corresponding to the block size in the first patch the by the predetermined number of bytes at a time.

* * * * *

UNITED STATES PATENT AND TRADEMARK OFFICE
CERTIFICATE OF CORRECTION

| | |
|---|---|
| PATENT NO. | : 11,327,741 B2 |
| APPLICATION NO. | : 16/924481 |
| DATED | : May 10, 2022 |
| INVENTOR(S) | : Akiyuki Hatakeyama |

It is certified that error appears in the above-identified patent and that said Letters Patent is hereby corrected as shown below:

In the Claims

In Claim 7, Column 9, Line 19, change "patch the each" to --patch file each--;

In Claim 7, Column 9, Line 24, change "first patch the" to --first patch file--;

In Claim 8, Column 9, Line 47, change "first patch the" to --first patch file--;

In Claim 9, Column 10, Line 27, change "first patch the" to --first patch file--;

In Claim 9, Column 10, Line 28, change "first patch the" to --first patch file--;

In Claim 9, Column 10, Line 30, change "second patch the" to --second patch file--; and In Claim 9, Column 10, Line 54, change "patch the" to --patch file--.

Signed and Sealed this
Twenty-third Day of August, 2022

Katherine Kelly Vidal
*Director of the United States Patent and Trademark Office*